United States Patent [19]

Baylor et al.

[11] Patent Number: 5,893,922

[45] Date of Patent: Apr. 13, 1999

[54] HOME NODE MIGRATION FOR DISTRIBUTED SHARED MEMORY SYSTEMS

[75] Inventors: Sandra Johnson Baylor, Ossining; Kattamuri Ekanadham, Mohegan Lake; Joefon Jann, Ossining; Beng-Hong Lim, White Plains; Pratap Chandra Pattnaik, Ossining, all of N.Y.

[73] Assignee: International Business Machines Corporation, Armonk, N.Y.

[21] Appl. No.: 08/813,814

[22] Filed: Mar. 6, 1997

[51] Int. Cl.⁶ ..................................................... G06F 13/00
[52] U.S. Cl. .................................................................. 711/148
[58] Field of Search ................................. 711/147, 148

[56] References Cited

U.S. PATENT DOCUMENTS

5,341,483  8/1994  Frank et al. ............... 711/206

Primary Examiner—David L. Robertson
Attorney, Agent, or Firm—Douglas W. Cameron

[57] ABSTRACT

A mechanism to dynamically migrate a home node of a global page to a more suitable node for improving performance of parallel applications running on a S-COMA and other DSM systems. More specifically, consultation counts are maintained at each client node of a shared memory system, where the consultation count indicates the number of times the client node has consulted the dynamic for lines a page. This information is then used along with other information to decide on whether to change the dynamic home node to a more suitable node.

5 Claims, 6 Drawing Sheets

HOME NODE MIGRATION FOR DISTRIBUTED SHARED MEMORY SYSTEMS

TECHNICAL FIELD

This invention provides a mechanism to improve the performance of parallel applications running on S-COMA (Simple Cache-Only Memory Architecture) computer systems as well as other DSM (Distributed Shared Memory) systems by dynamically migrating the home node of any global page to a more suitable node.

DESCRIPTION OF THE PRIOR ART

In the targeted architecture, any coherence-related access or other access that cannot be serviced at the client node results in a request for service to be sent to the home node of a globally shared page. This may result in a significant amount of traffic between the client nodes and the home node, resulting in slow effective bandwidth and latency for the system. Also excessive paging pressure at a home node can cause the system to halt. The following lists some of these circumstances in more details.

1. The home node does not participate in the sharing of the global page:

Two or more client nodes frequently share lines of a global page whose home node does not participate in this sharing. The hardware coherence protocol will require one extra trip through the home node for every coherence/data movement. This extra trip involves time consuming communication through the network, thereby slowing down the shared memory system.

One client node may frequently access a global page whose home node does not even access the global page (perhaps by bad assignment of static home node initially, or when the memory access pattern changes after a migration). This access by the client node will unnecessarily tie up a frame at the home node.

2. Too much paging activity at a home node may force the page replacement algorithm to replace a global page in order to service a request of an additional global page from a client node—a very time expensive operation.

In U.S. Pat. No. 5,535,116, each page has a plurality of data-items, and each data-item has a statically assigned home node which maintains its directory. The directory identifies all the sharing nodes as well as a single master node that is supposed to hold the master copy of the data-item. Each time a read request comes to the home node, it asks the master node to forward a copy of the data-item. When a write request comes, the home node asks all sharers to invalidate the data-item and asks the master to send the data (to the requester) and to give up mastership. The requester becomes the new master. The home node never changes in their patent.

REFERENCES

1. U.S. Pat. No. 5,535,116 "Flat Cache-Only Multiprocessor Architectures" by Anoop Gupta et al.
2. Computer Architecture A Quantitative Approach, 2nd edition, 1996 by D. Patterson & J. L. Hennessy (Morgan Kaufmann Publishers Inc) ISBN 1-55860-329-8 describes cache coherence in various computer architectures.

References 1–2 above are hereby incorporated herein by reference.

SUMMARY OF THE INVENTION

Our proposed solution to the problem involves 2 components:

1. A mechanism involving information maintained in network adapters and a protocol to enable migration.
2. Migration policies employing counters maintained in network adapters, and their interactions with OS to achieve efficient operation of the above migration mechanism.

Home node migration is important in the performance of DSM systems because the shared-memory access pattern of parallel applications is often hard to predict in advance, and may change during program execution. This invention provides a mechanism to dynamically migrate the home node of a global page to a more suitable node for improving performance of parallel applications running on an S-COMA and other DSM systems. In this invention, information is maintained in the shared memory adaptor (SMA) at each node, and this information is used in a protocol which enables migration. More specifically, information on the static home node and the dynamic home node of a global page is maintained at the static home node, the dynamic home node, and each client node of a global page. Also, at the SMA of each client node, a consultation count of the latest dynamic home node is maintained. This consultation count indicates the number of times the client node has consulted the dynamic home node for lines of the page. Also, at the SMA of the dynamic home node, a short list of the top N nodes, together with their consultation counts to the dynamic home node, is maintained. This information is then used (possibly with additional information e.g. paging pressures at the current and the potential new dynamic homes) to decide whether to change the dynamic home to a more suitable node. For example, if the consultation count exceeds a threshold, the dynamic home starts migrating to a more suitable node. With this invention, a message from a client node's SMA to another node's SMA always includes the static home node information and its consultation count to the dynamic home node. When a home node sends a reply, it always sends the dynamic home node information, and the recipient updates it dynamic home information.

It is an object of this invention to minimize time consuming communications between the SMA's of a shared memory system.

It is also an object of this invention to reduce paging activity at a home node.

Accordingly, this invention provides a method of migrating the dynamic home node of a global page to reduce time consuming communication between the SMAs of shared memory system. With this invention consultation counts are maintained, where each of the counts indicates the number of times a respective client node has consulted the dynamic home node of a global page, where the dynamic home node is the node at which the consultation counts are maintained. If the consultation count of a client node for the global page is greater than a selected threshold, then the dynamic home node is migrated to the client node.

DESCRIPTION OF THE PREFERRED EMBODIMENT

Our scheme assumes that the S-COMA system contains hardware to support cache coherency amongst the nodes, to implement a directory-based coherence protocol. In this application, this extra hardware is referred to as a Shared Memory Adapter (SMA), and there is an SMA at each node. We now define a few terms that are used in the sequel:

Node-set: A job in this system consists of a set of processes running on a set of nodes, called its node-set. Each node may be a uniprocessor or a multiprocessor.

In this application a page is chosen as the unit for a home and for home migration. Other units may also be possible.

Static home node: Each global page is assigned a static home node at its initialization. This is done by using a simple distribution function (e. g. successive pages are assigned to the nodes in the node-set in a round-robin manner, to get even distribution). The static home node of a global page does not change during the life of the application program. The static home is responsible for bringing pages in and out of the backing store. (Although this function can be performed by other nodes as well, we restrict it to the static home node for simplicity).

Dynamic home node: Each global page has a dynamic home node. The dynamic home for a page may change from time to time under the control of the algorithms described later. Sometimes (e.g. at job start time) the static home node itself may act as the dynamic home. The dynamic home node keeps track of the node-level directory information for cache lines in that global page. It enforces the Invalidation Protocol (a well-known art, summarized later) to maintain the coherence of each line.

Client node: Any node that is accessing one or more lines of a global page is considered as a client node for that global page. In an S-COMA system, a client node allocates a frame in the node's memory to hold lines of a global page.

Invalidation Protocol When a client node does not have a valid copy of a line that it needs, it sends a REQUEST message to the dynamic home node of that page. A request specifies the line address and indicates whether the client needs a shared or exclusive copy of the line.

If the request is for a shared copy, the dynamic home responds with a copy of the line. If the line is held by another client in an exclusive state, the dynamic home first retracts the exclusive state (by communicating with that client) and then sends the data to the requester. In either case, the new client is added to the directory.

If the request is for an exclusive copy, the dynamic home first invalidates copies of the line in all clients, by communicating with them. It then sends the data to the requester in exclusive mode. It updates the directory to reflect this state.

Figure 3:
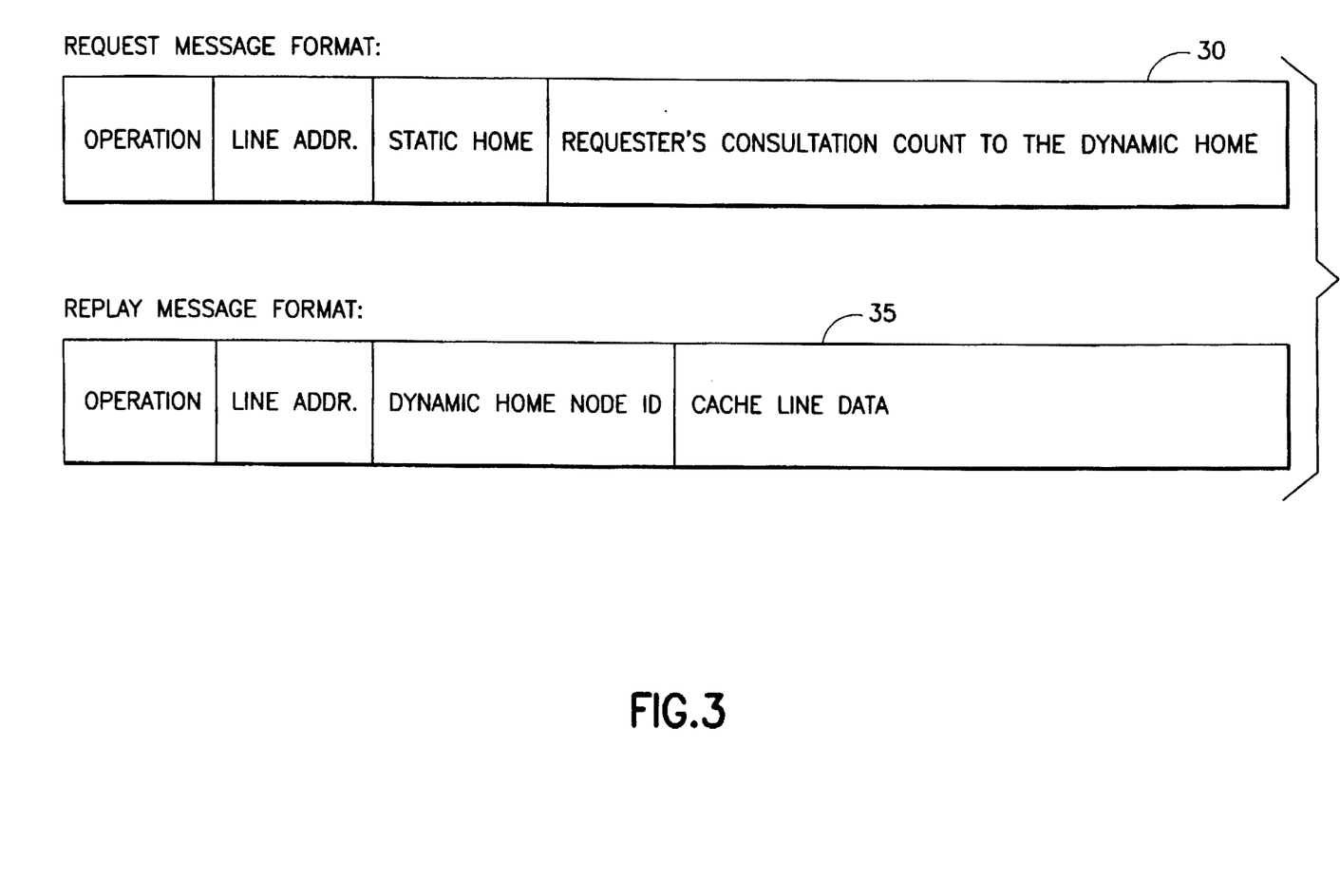
FIG. 3 schematically illustrates the request and reply messages sent between nodes.

Shown in FIG. 3 are the two types of messages that are transmitted between nodes to implement cache coherence and home node migration. Request messages (30) are sent by client nodes to a home node. The operation and line address fields are used as described above. The static home node and consultation count fields are added as part of the mechanism in this invention and are described later. The REPLY message (35) also has the operation and cache line address fields as described above, and the cache line data corresponding to the cache line address. The dynamic home node field is added as part of the mechanism in this invention and is explained later.

Figure 1:
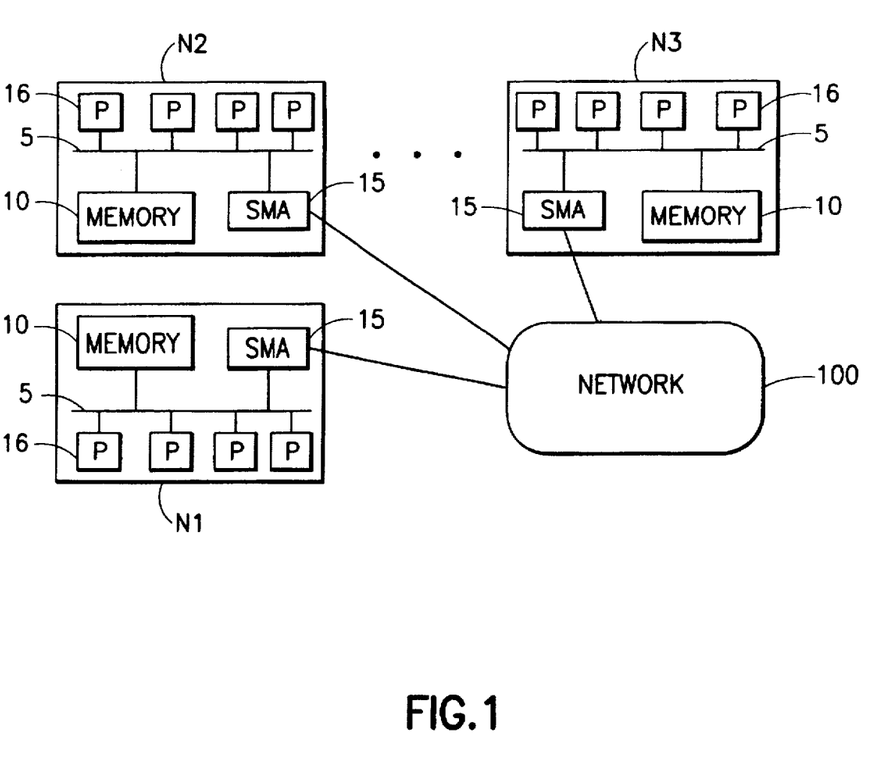
FIG. 1 is a schematic illustration of a distributed shared memory system having a plurality of nodes interconnected through a network.

Shown in FIG. 1 is a typical distributed shared memory system in which this invention is implemented. Shown are nodes N1 through N3 interconnected to each other through network (100). Each node is shown as having memory (10), a plurality of processors (16), and a shared memory adaptor (15), connected to each other through bus (5).

According to this invention, a request message, which may be a request for an update of a cache line of a global page in a node, is sent from a shared memory adaptor (15) of one of the nodes to another shared memory adaptor of another of the nodes. This message typically includes static home node information and a consultation count to the dynamic node.

Mechanism—Information maintained per global page

At Client Node: A client node maintains the following information about a global page that is mapped into its memory:

1. The static and dynamic home nodes for the page.
2. The number of requests sent to the dynamic home thus far. This is called the Consultation Count of this client.

At Static Home: The static home always remembers the dynamic home node for the page. Any changes to the dynamic home are performed by coordination with the static home.

Dynamic Home: The dynamic home keeps the following information:

1. The static home node for this page.
2. The directory of all the lines in this page, containing the state of each line and the list of nodes sharing the line.
3. Its own consultation count (i.e. access by processors within the dynamic home node needs consultation of the directory).
4. The highest N consultation counts and the corresponding client node numbers, for this page. N is a hardware parameter and is typically 4.

Mechanism—Protocol

Page Fault: The first time a processor accesses a line in a global page, a page-fault (well-known art) occurs and the operating system allocates a frame in the memory and maps the global page to that frame. At this time, the SMA is informed of the corresponding static and dynamic home nodes of the page. The SMA stores this information into its tables and resets its consultation count for this page to zero. The adapter also marks all the lines in the memory frame as invalid.

Client Sends Request to Dynamic Home: When a processor at the client node accesses an invalid line, a request message is composed for the corresponding line. The consultation count for the page is incremented. The request (see FIG. 3) includes the line address, operation, the static home node of the line, and the current consultation count.

Figure 2:
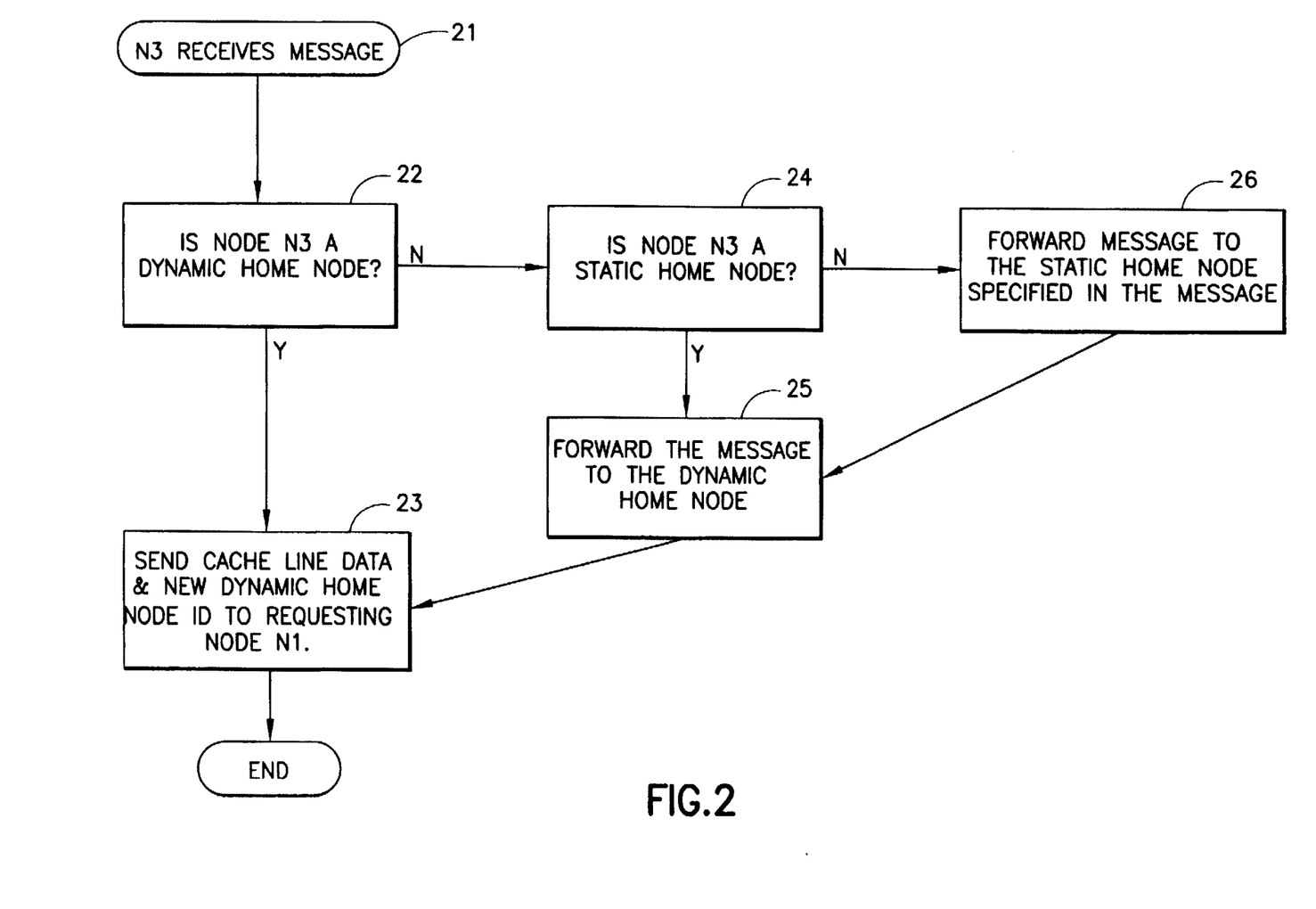
FIG. 2 schematically illustrates the flowchart for the basic home node migration protocol according to the invention.

A Node Receives a Request: Referring to FIG. 1 and FIG. 2, with this invention, when a arbitrary node (say N3) receives a message (21) from the requesting node (say N1), node N3 does the following:

1. If node N3 is the dynamic home node for that page (22), then node N3 processes the message (23), as described later.
2. If node N3 is the static home and not the dynamic home for that page (24), it forwards the message to the current dynamic home node (25). Recall that the static home node always knows the correct dynamic home.
3. If node N3 is neither the static nor dynamic home for that page, it picks up the static home node number contained in the request and forwards the message to the static home (26).

The situation in which a node N3 (which is neither the dynamic home nor the static home) is being sent a request arises when it has been the dynamic home for a while and other nodes (such as N1) have recorded this information. But after some time, the dynamic home has been changed to some other node, and the requester (such as N1) still has the outdated information i.e. thinks that N3 is still the dynamic home. Typically N3 has deleted the page and the associated information (including the static home node number) from its tables. Hence N3 uses the static home node number contained in the message and forwards it.

Dynamic Home receives a Client Request: When a dynamic home node receives a client request message, it services the request as per the invalidation protocol described earlier. In addition, it also updates its list of consultation counts. That is, if this client's consultation count passed in the message is one of the highest N counts, it is inserted into the sorted top list of N items, and causes the bottom list-item to drop out. For best performance, it may be necessary to make such updates less frequently than on the receipt of every message.

Client Node Receives Reply from Home: When a dynamic home node services a request, it sends a reply message to the requesting client. As part of the reply, the line number, operation and line data are supplied. In addition, the new dynamic home node number is also supplied, and the client updates its dynamic home node number. This way, stale information is automatically updated based on need. Update information is not sent when there is no further activity from a client, and this is harmless.

Use of Consultation Counts: The consultation count of a client node reflects the amount of traffic between the client and the dynamic home. The counts are maintained by all client nodes, including the dynamic home nodes. Thus, for instance, suppose there are 4 nodes, N1,N2,N3,N4, where N4 is the dynamic home. Suppose all the nodes access lines from the page and the consultation counts for them are 5, 10, 2, 3, respectively. This implies that N2 is consulting the directory more heavily than other nodes. If the home is moved to N2, it would reduce messages between nodes N2 and N4. Thus, a criterion for causing a change in the dynamic node is that the consultation count of some client is greater than the consultation count of the dynamic home itself by a predefined margin. When the dynamic home observes this situation, it communicates with the static home, supplying the node number of the client that has the maximum consultation count. The static home then arranges for the migration as described later.

Page Pressure at Dynamic Home: When page pressure builds up, the operating system at the dynamic home may decide to evict a page. It then communicates this to the SMA. The SMA picks up the node that has the highest consultation count (besides itself) and sends the migration request to the static home node. After the migration is completed, the page eviction can take place.

Coordination for Migration: In either of the above two cases, the static home node receives a migration request along with the prospective candidates for a new dynamic home. The static home node communicates with the SMAs in the candidate nodes, gets confirmation and then initiates the migration to the most suitable candidate.

The migration involves the following steps:

1. The old dynamic home node sends a copy of the directory for all the lines in the page to the new candidate home.
2. The new home stores the directory into its tables.
3. The static home node updates its entry for dynamic node.
4. The old dynamic home deletes the directory for the page. It may then push out any modified lines to the new dynamic home node and delete the page from its memory thereafter.

Figure 4A:
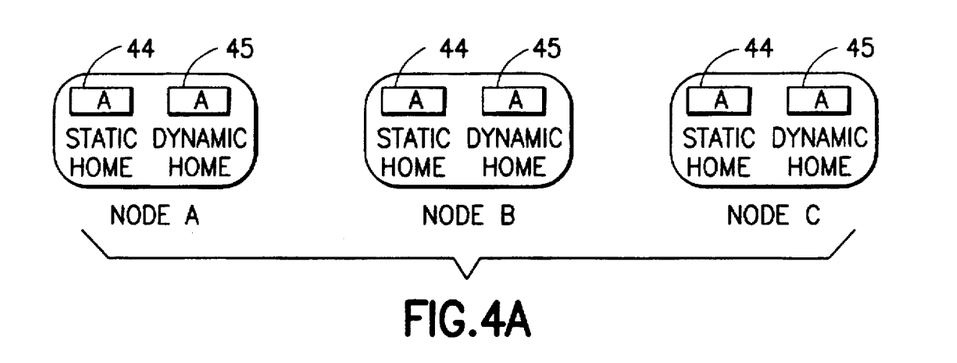
FIG. 4 graphically illustrates the home migration mechanism in accordance with this invention.

Illustration: The following series of figures illustrate how the mechanism described above normally works:

FIG. 4A shows the Operating System in each of three nodes A through C that share a particular global page initially allocating a frame for the page and specifying node A as the static home (44) and dynamic home (45).

Figure 4B:
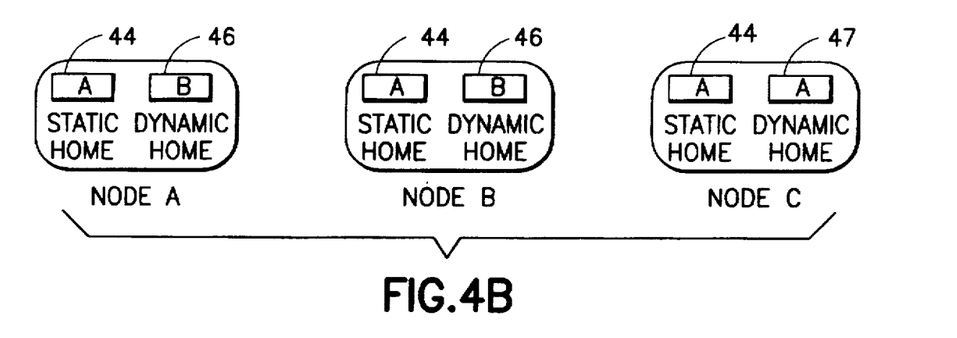

FIG. 4B shows that after some amount of network traffic, nodes A and B negotiate (See description of coordination for migration above.) and decide to make node B the dynamic home (46). After B becomes the dynamic home, node C is still unaware of it (47).

Figure 4C:
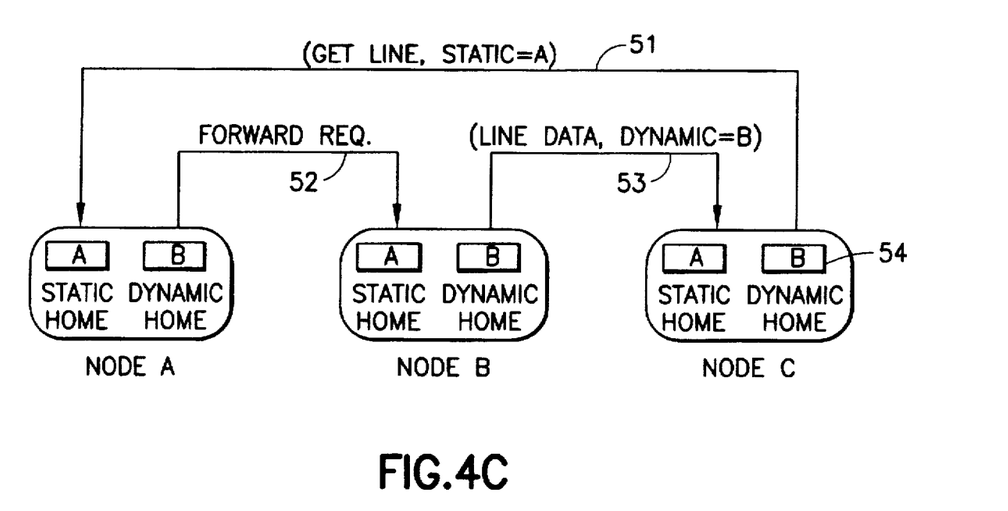

FIG. 4C—Node C now requests (51) node A for a line in the global page, as it thinks A is the dynamic home. Node A then forwards the request (52) to the dynamic home B, which sends the line data and informs C that the dynamic home is now B (53). Node C then updates its dynamic home information (54).

Figure 4D:
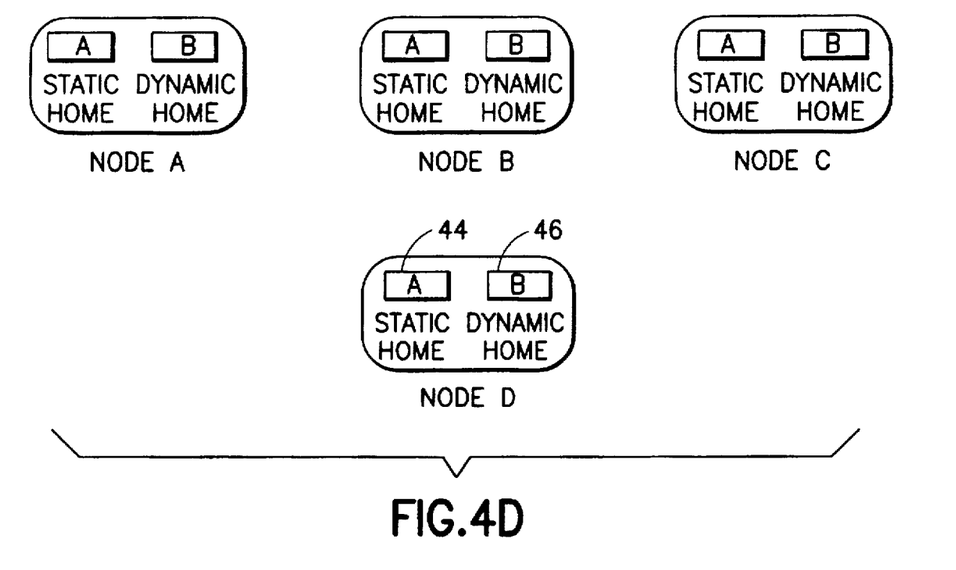

FIG. 4D—Node D now also brings in this page and goes through similar steps, i.e. initially it is set up with A as static home (44) and dynamic home. Then on its first read operation, it is informed that the dynamic node is B. It then updates its information as shown (46).

Figure 4E:
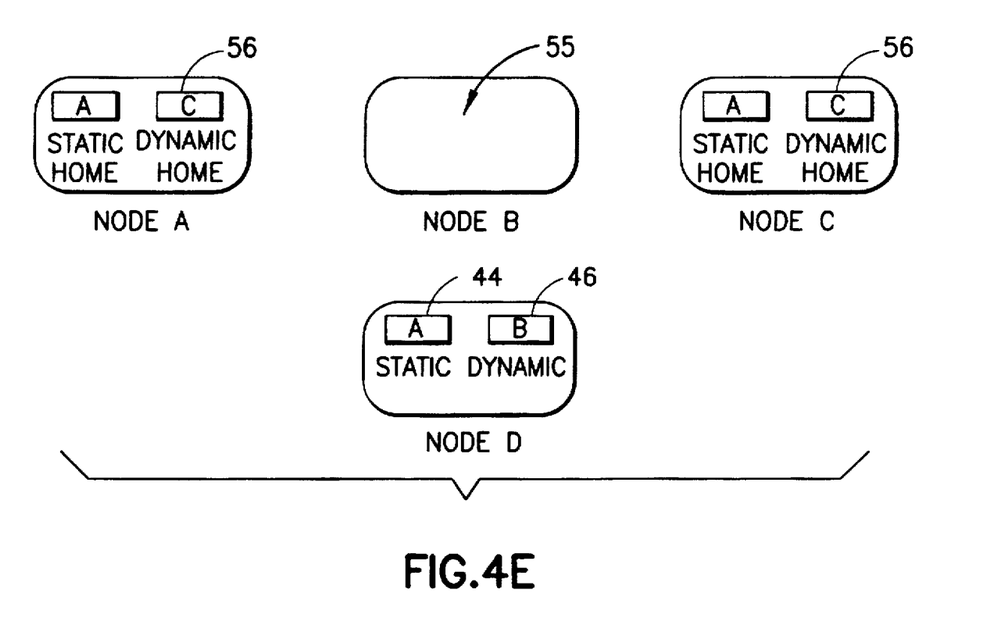

FIG. 4E—Node B later negotiates with A and C, transfers the dynamic home of the global page to C (56) and drops the page from its memory (55).

Figure 4F:
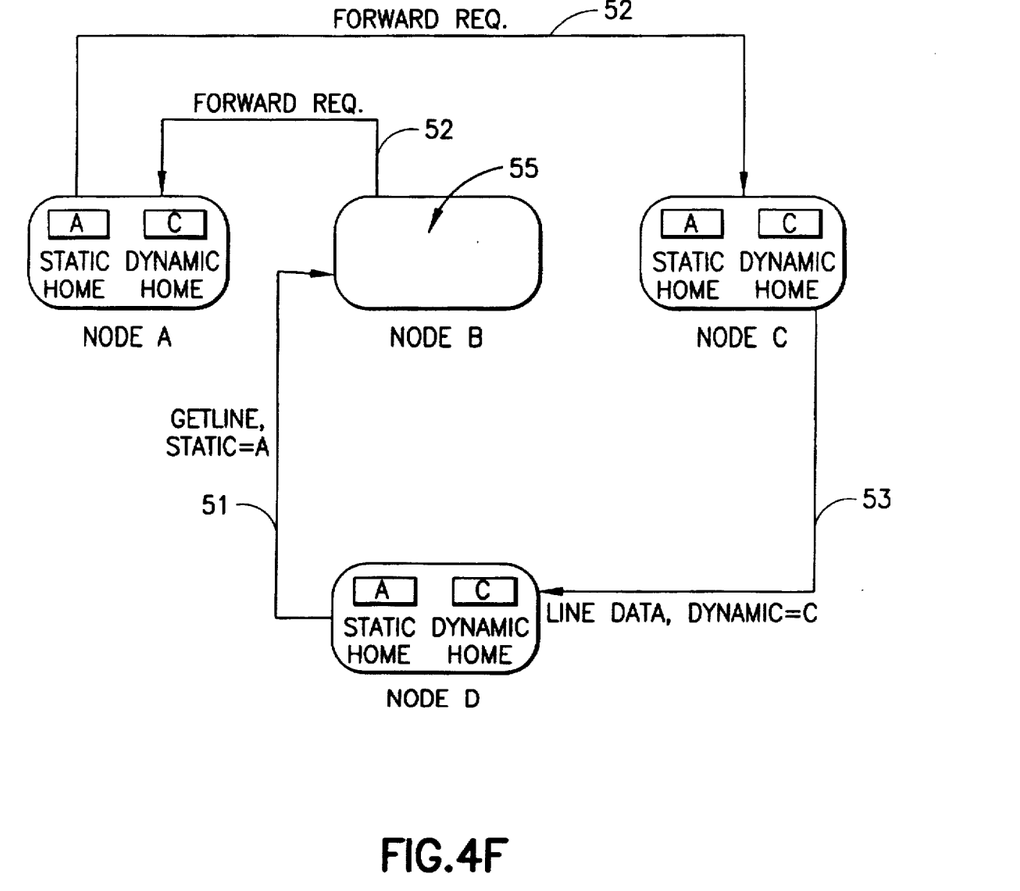

FIG. 4F

1. Node D requests (51) a line in the global page. It sends the request to B as it thinks B to be the dynamic home.
2. Node B has dropped all information on this page (55), and hence forwards the line request (52) to the static home (A) contained in the message.
3. Node A forwards the request (52) to the dynamic home C.
4. Node C then sends line data and the up-to-date dynamic home (53) information to node D.

Having thus described our invention, what we claim as new and desire to secure by Letters Patent are:

1. In a Distributed Shared Memory system, a method of migrating a dynamic home node of a global page, said method comprising:

a. assigning a static home node and a dynamic home node for said global page;
   b. maintaining the current identification of said dynamic home node by said static home node;
   c. maintaining by said dynamic home node a directory for lines of said global page;
   d. initializing each client node of said global page by storing in each client node the identity of said static and said dynamic home nodes;
   e. when said client node requests data, sending a request message only to said dynamic home node, wherein said request message comprises the identification of said static home node;
   f. when said dynamic home node is to be migrated from node $D_x$ to node $D_y$, sending the said directory from $D_x$ to $D_y$, wherein said directory is deleted from $D_x$, and wherein said static home node updates the identification of said dynamic home node from $D_x$ to $D_y$;
   g. when a client node receives said request message, forwarding said request message to said static home node whose identification is contained in said request message as per step e;
   h. when said static home node receives a request message, forwarding said request message to said dynamic home node, whose identification is known to the static home node, wherein said dynamic node identification is maintained as in step c above; and i. when a current dynamic home node sends a reply message in response to a request message from a client node, said reply message comprises the identification of said current dynamic home node.

2. A method of determining where to migrate a dynamic home node, said method comprising:

a. maintaining consultation counts on said global page, each of said consultation counts being associated with a node in a node set associated with said global page, each said consultation count indicating the number of times the client has consulted said dynamic home node of said global page;

b. maintaining a top list of nodes of said global page, said top list identifying those of said nodes with the highest of said consultation counts; and c. migrating said dynamic home node to one of said nodes in said top list of nodes.

3. A method as recited in claim 2, wherein the dynamic home node is migrated to the node of said top list having the highest consultation count.

4. A method as recited in claim 3, wherein each client maintains its own consultation count and communicates it to said dynamic home node with each request message that each client sends to said dynamic home node, and where said top list is maintained by said dynamic home node.

5. A home node migration mechanism that is applicable not only to cache only memory architectures but also any non-uniform memory architecture distributed shared memory systems supporting dynamic remapping of physical addresses to actual memory addresses, a method of migrating the home node of a global page to another node, said method comprising:

a. assigning a static home node and a dynamic home node for said global page;

b. maintaining the current identification of said dynamic home node by said static home node;

c. maintaining by said dynamic home node a directory for lines of said global page;

d. initializing each client node of said global page by storing in each client node the identity of said static and said dynamic home nodes;

e. when said client node requests data, sending a request message only to said dynamic home node, wherein said request message comprises the identification of said static home node;

f. when said dynamic home node is to be migrated from node $D_x$ to node $D_y$, sending the said directory from $D_x$ to $D_y$, wherein said directory is deleted from $D_x$, and wherein said static home node updates the identification of said dynamic home node from $D_x$ to $D_y$;

g. when a client node receives said request message, forwarding said request message to said static home node whose identification is contained in said request message as per step e;

h. when said static home node receives a request message, forwarding said request message to said dynamic home node, whose identification is known to the static home node, wherein said dynamic node identification is maintained as in step c above; and i. when a current dynamic home node sends a reply message in response to a request message from a client node, said reply message comprises the identification of said current dynamic home node.

* * * * *